US008868757B1

(12) United States Patent
Liu et al.

(10) Patent No.: US 8,868,757 B1
(45) Date of Patent: Oct. 21, 2014

(54) TWO-WAY WEB SERVICE ROUTER GATEWAY

(75) Inventors: Feng Liu, Hillsborough, NJ (US); Gesan Wang, Lafayette, LA (US); Wu Chou, Basking Ride, NJ (US); Lookman Yasin Fazel, Franklin Park, NJ (US); Li Li, Bridgewater, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1926 days.

(21) Appl. No.: 11/748,261

(22) Filed: May 14, 2007

Related U.S. Application Data

(60) Provisional application No. 60/803,088, filed on May 24, 2006.

(51) Int. Cl.
*G06F 15/16* (2006.01)
*G06F 15/177* (2006.01)

(52) U.S. Cl.
USPC ........................................ 709/227; 709/220

(58) Field of Classification Search
CPC .......... H04L 5/00; H04L 25/00; H04L 12/00; H04L 29/00; H04B 3/00
USPC ................................................ 709/227, 220
See application file for complete search history.

(56) References Cited

U.S. PATENT DOCUMENTS

| 7,552,170 | B2* | 6/2009 | Owen et al. | 709/203 |
|---|---|---|---|---|
| 7,561,586 | B2* | 7/2009 | Wang et al. | 370/401 |
| 7,640,348 | B2* | 12/2009 | Atwal et al. | 709/229 |
| 2005/0063411 | A1* | 3/2005 | Wang et al. | 370/437 |
| 2005/0108411 | A1* | 5/2005 | Kliland et al. | 709/230 |
| 2006/0235973 | A1* | 10/2006 | McBride et al. | 709/226 |
| 2007/0156868 | A1* | 7/2007 | Keren et al. | 709/223 |
| 2007/0174454 | A1* | 7/2007 | Mitchell et al. | 709/225 |

* cited by examiner

*Primary Examiner* — Ebrahim Golabbakhsh
(74) *Attorney, Agent, or Firm* — Anderson Gorecki & Rouille LLP

(57) ABSTRACT

A method, apparatus and computer program product for providing two-way web service interaction crossing different enterprise domains is presented. A web service gateway provides data tunnels for directing web service requests and responses between a first endpoint, a second endpoint and the web service gateway, wherein the first endpoint is located in a different enterprise network than said second endpoint. A Service Local Registry is maintained at the gateway, the Service Local Registry exposing Web Service Description Language (WSDL) interfaces of the first endpoint and the second endpoint.

20 Claims, 4 Drawing Sheets

TWO-WAY WEB SERVICE ROUTER GATEWAY

CROSS REFERENCE TO RELATED APPLICATIONS

The present application claims the benefit of U.S. Provisional Patent Application No. 60/803,088, filed on May 24, 2006, which is incorporated herein by reference in its entirety.

BACKGROUND

As an important methodology, web service provides a way to realize loosely coupled service-oriented architecture and interoperable solutions across heterogeneous platforms and systems. Web services are well suited for integrating disparate enterprise systems, particularly those having evolved over time. By enabling existing enterprise resources through web services, these enterprises can be expanded to provide services to a wider variety of clients.

Web services are constructed around a set of standard protocols, such as WSDL, SOAP, and UDDI (described below). In particular, WSDL (Web Service Description Language) is an XML-based language for describing the services. It contains information pertaining to the service description of Web services, such as the interface, the service operations, the data type schema information, the parameters required to invoke the Web service, etc. It provides the message level coupling between various components in a service-oriented system.

Simple Object Access Protocol (SOAP) is a standard protocol for exchanging XML-based information over the network. It provides a platform independent way to access and utilize Web services located on different distributed systems, UDDI (Universal Description, Discovery, and Integration) defines a format for discovery as well as a protocol for retrieving the discovery document. It provides a registry mechanism for clients and servers to find each other.

Traditional web service interaction is based on one-way request/response interaction pattern that a client (e.g. service consumer) makes a service request to the server (e.g. service provider) based on the services specified by the server's WSDL. The server responds with the requested service to the client in its positive response SOAP message. Otherwise, a fault message will be sent from the server to the client. It only requires one WSDL at the server side to conduct the interaction. Albeit being simple, it has been extremely useful, because it is well suited for the Internet infrastructure and the WSDL based service description is extensible and self-describing.

Two-way web service interaction is a new trend in web services, motivated by the critical needs to support asynchronous outbound web service operations, event subscription/notification, service grids, communication, etc. In two-way web service interaction, each web service SOAP node is both a client and a server, and it requires two appropriate WSDLs, one at each web service SOAP node to conduct two-way web service interaction. One typical use of two-way web services is for event subscription and notification, in which the client needs to submit a request to the server to subscribe events from an interested source at the server. In client-to-server web service interaction, the client must specify an appropriate event sink described by its WSDL for server to push events to the client through a server-to-client web service interaction. For example, when the subscribed event occurs at the server, the server will proactively send the event to the client event sink acting in a role of a client.

When deploying web services for enterprises, there is an acute need to allow web services to cross different enterprise network domains of firewalls/NATs, because the very nature of web services is to integrate disparate enterprise systems located at different enterprise domains, or even at different enterprises. Branch offices and mobile workers need to interact with headquarters through web services, and enterprises need to communicate with their suppliers, partners, etc., through web services to enable their business process.

While one-way web services crossing enterprise domains is less a problem, adopting two-way web service (or any asynchronous web service) interaction will face serious problems when it comes to cross enterprise domains and firewalls. This is because enterprise networks are typically protected by network address translation (NAT) devices and strictly configured firewalls. NAT hides the enterprise (internal) network addresses from the public Internet, allowing multiple computers inside the enterprise networks to share a (or a group of) public addresses, and also providing protections to the enterprise networks by limiting the access of the external computers into the enterprise networks.

A firewall is a system or group of systems that enforce access control policies between two networks. Firewalls are designed to prevent unauthorized access to or from an internal network. NAT/firewalls shield enterprise (internal) networks by blocking the incoming traffic initiated from the public (external) network and opening only limited ports for outgoing traffic, such as HTTP port 80. The NAT/firewall can be a showstopper for asynchronous (two-way) web service interactions between two computers that are located in two separate networks. This is because 1) both networks are behind their own NAT/firewall, and thus the IP address of the service is not addressable/routable outside the private network; and 2) in most cases, NAT/firewalls block the incoming traffic, thus the computer in one network cannot reach the other one that located in another network.

One common practice to address this problem is that enterprises expose the service to the external clients by changing their network NATs/firewalls configurations. For one-way web service, only the service provider (server side) needs to expose the service interface, and service consumers (client side) do not need to do anything. For the two-way web services, it requires both the service provider and service consumers to expose their service interfaces to be addressed from external network. Since enterprises deploy sophisticated security infrastructure and stringent access control measures, IT network administrators are highly resistant to any attempt to reconfigure their NAT/firewall. Before changes can be considered, it has to go through a lengthy review and approval process. Maintaining and servicing these special service openings on the NAT/firewall can be an exorbitant task, and it is definitely not for dynamic changes for on-demand services. But most importantly, practices from prior arts for one-way web services cannot be applied directly to two-way web services, because of serious security issues that causes both clients and service providers to expose excessive internal interfaces to external networks.

Another practice to address this new demand for two-way web services is to deploy a virtual private network (VPN) to link disparate networks together. However, VPN is very expensive and complex. Moreover, enterprises do not allow other enterprises, their partners or suppliers to access their internal enterprise networks through VPN directly because of privacy, security, and protection reasons.

For the past few years, extensive studies on NAT/firewall traversal have been carried out at both academia and industry. However, there is still no single solution which is flexible enough to work well in the two-way web service scenario. For example, Simple Traversal of UDP through NAT (STUN) can solve some of NAT issues, however, it will not work with Symmetric NAT which is often found in the networks of large enterprises. Traversal Using Relay NAT (TURN) solves this by using relay, however it assumes peer-to-peer connectivity. It is not suitable for a client to use the STUN relay server to run a traditional server. Interactive Connectivity Establishment (ICE) tries to uses both of them in a specific way to avoid the pitfalls of using any one of them alone. However, it is not a new protocol from the communication protocol perspective. And all the above methods try to solve NAT/firewall issue for Voice over IP (VoIP), and they don't address the special requirements in web services applications. Another problem is the scalability issue, which makes the above methods impractical in the two-way web service scenario. Most importantly, these methods and studies did not take into account the two-way web service nature that requires matching WSDLs at each service end and SOAP message exchange in two-way, full duplex interaction.

Sockets (SOCKS) is an Internet protocol that allows client-server applications to transparently use the services of a network firewall. SOCKS and SOCKS based products form another category of widely used NAT/firewall traversal approaches. It allows servers on each side of a network barrier to communicate with each other. It is often used as a firewall that straddles the network barrier and permits the communication. However, SOCKS is not suitable for the two-way web services because both client and server are typically behind their own firewalls. In such situation, the address in the protocol the SOCK's server passed to the destination will become un-routable. Moreover, although SOCKS can be used to allow the clients outside the firewall ("exterior clients") to connect to servers inside the firewall (internal servers), it allows only one exterior client with the specific IP address/port to connect to another application that is on the internal server. This is not suitable for two-way web services, where there are multiple servers and clients and IP addresses, service ports, etc., can all be dynamic.

One study related to firewall traversal for web service SOAP messages is the work of Web Service Dispatcher (WSP) system. It uses WSP as an intermediate service that can forward SOAP messages and assist asynchronous message exchanges. It addresses the client side NAT/firewall issue by setting up a WS-MsgBox service at the WSP dispatcher. It receives and stores the service responses for the client, whereas the client needs to fetch the responses from WS-MsgBox regularly for messages. Although the WSP system probably is able to solve the NAT/firewall traversal problem for normal one-way web service interaction, it is not suitable for two-way web service interaction, e.g. those used in telecommunication, because the "pulling" scheme is too slow to satisfy the real-time communication requirement.

SUMMARY

A Two-way Web Service Router Gateway (referred to herein as TARGET), for two-way web service interaction crossing enterprise domain and firewall is described. With TARGET, web service clients and web service servers can interact with each other bi-directionally, even if they are in disparate networks, with different network infrastructure and different NAT/firewall configurations. TARGET provides full support for asynchronous operation and event notification in web services. Compared with the conventional web service access gateways designed for one-way web service interaction, TARGET requires little or no configuration/modification of enterprise NAT/firewalls. In the following descriptions, both web service client and service server are referred to as web service endpoint, or endpoint.

In a particular embodiment of a method for providing two-way web service interaction crossing an enterprise domain, the method includes establishing, by a web service gateway, data tunnels for directing web service requests and responses between a first endpoint, a second endpoint and the web service gateway, wherein the first endpoint is located in a different enterprise network than the second endpoint. The method also includes routing web service requests and responses by the service location that specified in the SOAP header. The method also includes maintaining a Service Local Registry at the gateway, the Service Local Registry exposing Web Service Description Language (WSDL) interfaces of the first endpoint and the second endpoint.

Other embodiments include a computer readable medium having computer readable code thereon for providing two-way web service interaction crossing an enterprise domain. The medium includes instructions for establishing, by a web service gateway, data tunnels for directing web service requests and responses between a first endpoint, a second endpoint and the web service gateway, wherein the first endpoint is located in a different enterprise network than the second endpoint. The medium further includes instructions for maintaining a Service Local Registry at the gateway, the Service Local Registry exposing Web Service Description Languages (WSDL) interfaces of the first endpoint and the second endpoint.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides providing two-way web service interaction crossing an enterprise domain as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing two-way web service interaction crossing an enterprise domain as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention enable two-way web service interactions where two endpoints wish to interact with each other in a full duplex web service interaction. This scenario is common in telecommunication and other real-time applications where both endpoints are located behind different firewalls in two separate internal networks as illustrated in FIG. 1.

Figure 1:
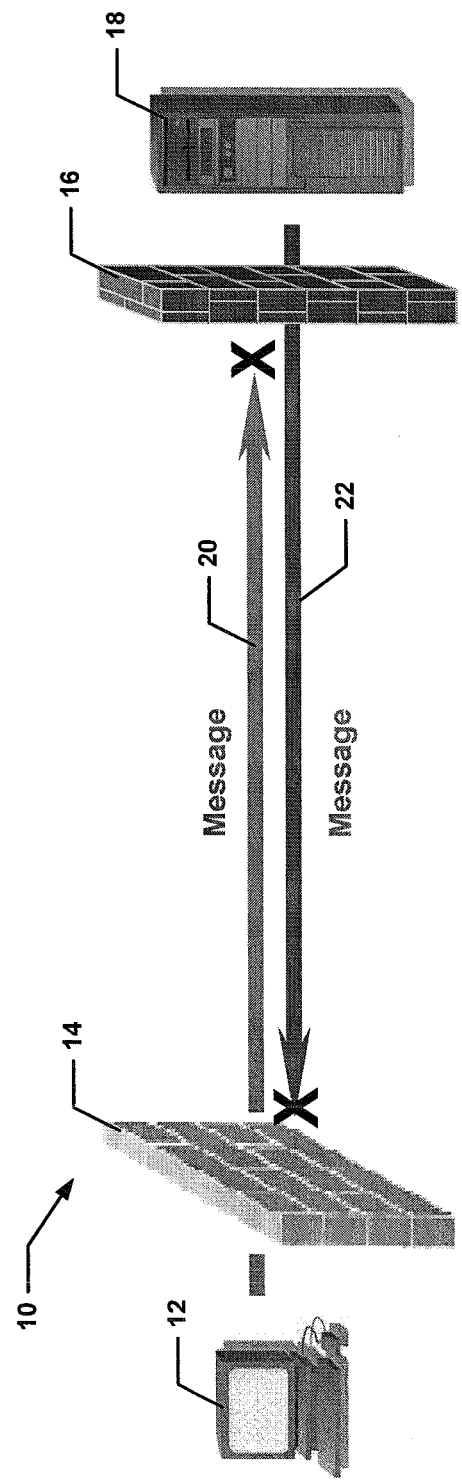
FIG. 1 illustrates an example prior art computer system environment where an endpoint behind its own NAT/firewall wishes to interact with another endpoint behind another NAT/firewall in a two-way web service interaction fashion, and how NAT/firewalls block such interactions.

The environment 10 of FIG. 1 includes a first endpoint 12 in a first domain behind a first firewall 14. A second endpoint 18 is behind a second firewall 16 in a second domain. If there were only one unidirectional firewall between a client and a server, tunneling is sufficient to solve the firewall traversal problem. However, in most cases client and server are located in different enterprises and protected by separate firewalls. Unfortunately, both of them are unidirectional firewalls and neither of them can accept inbound connection requests. For example, the message 20 from first endpoint 12 (e.g. a server) can traverse first firewall 14 but is blocked by second firewall 16, and therefore is not received by second endpoint 18 (e.g. a client). The same situation occurs in the opposite direction. The message 22 from second endpoint 18 can traverse second firewall 16 but is blocked by first firewall 14, and therefore is not received by first endpoint 12.

Two-Way Web Service Gateway (TARGET) is designed as the entrance to both enterprise networks where client and service server locate respectively. For simplicity, FIG. 1 and FIG. 2 only contain one client and one server, though TARGET is designed to support multiple clients and servers, which may each be behind their own NAT/firewalls, respectively. TARGET is the web service access point that bridges two-way web service interaction traversing through enterprise NAT/firewalls. From the SOAP message exchange perspective, TARGET is a special type of two-way SOAP Router. It determines where to direct web service requests/responses arriving from either direction for desired services where the physical server and client can be behind the firewall. This requires TARGET to also be a data gateway with the capability of data tunneling, which conveys data through firewalls on behalf of the enterprise networks by encapsulating the private data within the public network transmission. Besides these two major functions, the TARGET system is designed for two-way web service interaction, and it must have its Service Local Registry that exposes the WSDL interfaces of both the server and the client for reliable service invocation and event notification between two parties. This is because TARGET is exposed as the only visible location for services of the server (server WSDL) and for service interface of the client (client WSDL). The client interacts with TARGET based on the server WSDL registered at TARGET service local registry, as if it directly interacts with the server. On the other hand, the server interacts with TARGET based on the client service interface WSDL registered at TARGET service local registry, as if it interacts directly with the client. This unique infrastructure of TARGET is used to enable two-way web service interaction, because each party in the two-way web service interaction can be behind its own enterprise NAT/firewalls.

Figure 2:
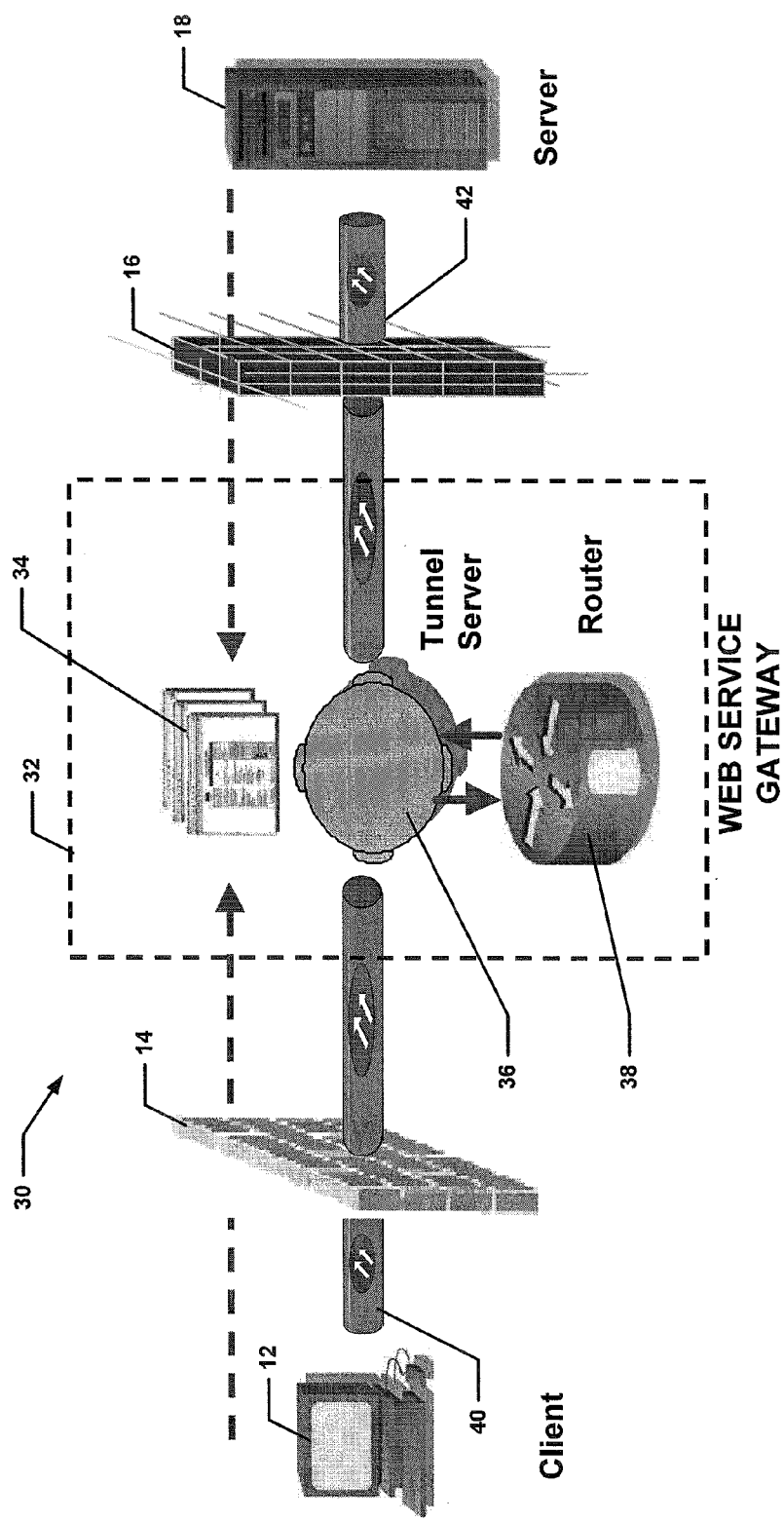
FIG. 2 illustrates an example computer system architecture for a computer system that performs two-way web service interaction crossing an enterprise domain in accordance with embodiments of the invention.

TARGET also takes care of certain security issues such as user authentication, message integrity, message confidentiality, and so forth. The system architecture 30 of TARGET is depicted in FIG. 2. The Web Service gateway (TARGET) 32 is disposed between the first firewall 14 and client 12 of a first domain and the second firewall 16 and server 18 of a second domain. TARGET 32 includes WSDLs 34, a tunnel server 36 and a router 38.

When an enterprise is protected by a strictly configured firewall, which only allows outbound connection, any service deployed inside the enterprise cannot be directly invoked from the outside, because any such service request initiated from outside is blocked by the firewall. To ensure these services to be utilizable, a tunneling mechanism is required to establish a tunnel between an endpoint and TARGET server that encloses multiple data flows in one pair of ports.

There are two types of data packets within a tunnel, i.e. outgoing and incoming. Outgoing data includes requests and responses sent from the endpoint to TARGET server. Incoming data includes the requests and responses forwarded from TARGET server to the endpoint. In order to enable two-way web service interaction which is a bi-directional communication through tunneling, both outgoing and incoming data flow are required with one for each direction. This is achieved by the multiplexing technique. At each end of the tunnel, a multiplexer is employed to combine different incoming data flows into a single one and send the data to the remote side, and a demultiplexer to receive the data from remote side and disassemble into multiple incoming streams.

If a server 18 is behind a unidirectional firewall 16, the tunneling establishment process must be launched from the server 18 to TARGET server 32, because any requests sent from the outside to the server will be blocked by the firewall. In order to support two-way (or asynchronous) web service interaction, there must be an intermediary router gateway 32 sitting between the client and the server to bridge the two unidirectional connections 40 and 42 into one two-way connection. Meanwhile, the intermediary must act as a switch that channels incoming data from one tunnel to another, which is achieved by a special SOAP router between clients and servers to broker SOAP messages for each other.

When receiving a SOAP message, the router makes the routing decision based on either the Universal Resource Identifier (URI) of the intended receiver (Destination Based Routing), or the content in the SOAP header or body (Content Based Routing).

Preferably, TARGET is deployed in the demilitarized zone (DMZ) of the enterprise network, accessible by web service endpoints (either client or server) located in the trusted internal network or external public network. With the maturing of WS-Security, the adoption and use of web services beyond the DMZ of the corporate organizational boundaries is becoming more prevalent.

Figure 3:
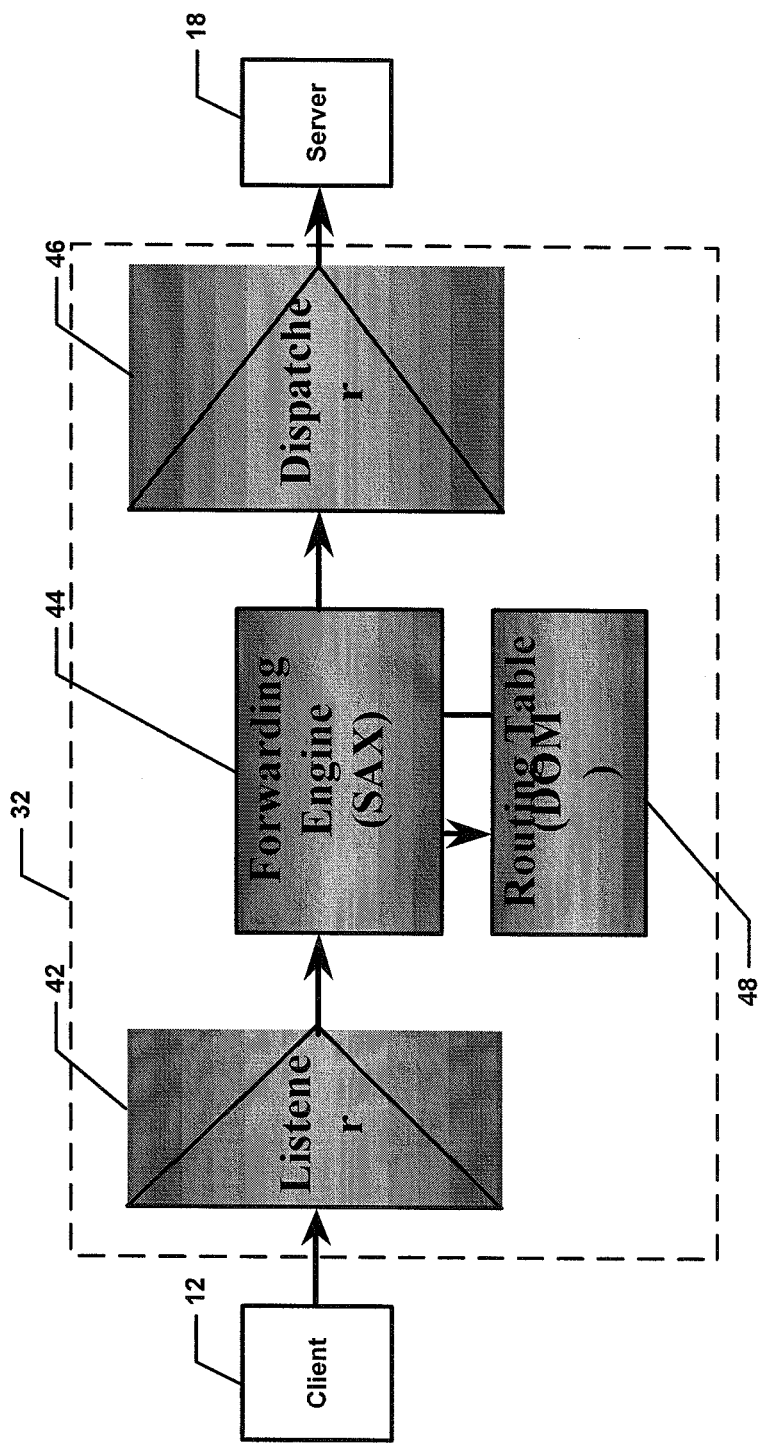
FIG. 3 illustrates an example SOAP router architecture.

In one particular embodiment, the functional components of TARGET for two-way SOAP message routing are depicted in FIG. 3. The Listener (HL) 42 takes all the SOAP messages arriving at TARGET and hands them to the Forwarding Engine (FE) 44 for the further processing. The FE 44 parses the message, which contains a SOAP envelope, and retrieves the WS-Addressing headers or any content designated as part of the key to query the Routing Table (RT) 48. The RT 48 maintains a XML file consisting of <destination, next-hop> pairs. The file is loaded into memory for fast access. When queried by the FE 44, the RT 48 searches the routing table and returns the "next-hop" address for a SOAP message towards its endpoint "destination". The Dispatcher (HD) 46 dispatches the SOAP message to its "next-hop" according to the query result from the RT 48.

Although web service SOAP messages are usually transported through HTTP, they can also be transported through other transport mechanisms. In order to provide a generic solution, TARGET extracts service destination information from WS-Addressing headers as well as other transport-dependent headers. It is understood that both the service subscribers and services providers share the common understanding of WS-Addressing which is a W3C standard, and which is designed to be transport-neutral, and follows the two-way web service approach to achieve asynchronous communication.

It is important to be aware that tunneling establishment procedures in TARGET need to be initialized from both web service endpoints to TARGET, because of the nature/restriction of the unidirectional firewall. Moreover, the use of multiplexer and demultiplexer creates a one-direction communication from one web service endpoint to the other.

NAT firewalls (especially symmetric NAT) will block inbound IP communications, because the private IP addresses owned by the hosts behind NATs are not routable outside the enterprise, and in fact, the private IP address is normally invisible to the public Internet. As a result, services offered by an enterprise using NATs cannot be utilized. This means that none of their web service endpoint service descriptions (i.e. WSDLs), messages, and binding mechanisms can be seen from the public internet. To address this problem, TARGET deploys a Service Local Registry as a two-side mirror to expose the gateway as the only accessible peer to the service consumers, i.e. a client communicates with TARGET instead of the service server directly. In other words, TARGET deals with the clients on behalf of service servers. On the other hand, in two-way web service interaction, clients also need to expose some of their own web service interfaces to enable the server to contact them.

Since a client may be protected by firewalls and unreachable by the service provider, it needs to register its own service interface (client WSDL) on TARGET to make it visible for server to interact with.

It should be noted that a service registered on TARGET doesn't mean the service itself is physically deployed on TARGET. The real service is still hosted on its original server. The only function of the Service Local Register is to do WSDL pre-fetching to allow the service descriptions to be visible to the other party. The original WSDL file of a service will be unchanged, except the real service location indicated in <soap:address location="uri"/> is changed to the location of the TARGET. For example, <soap:address location="http://stock.com/stockquote"/> becomes <soap:addresslocation="http://target/stock.com/stockquote"/>, where target is the host name of TARGE gateway. From a client perspective, the service stockQuoteService is seen on TARGET, and the client sends service requests to http://router/ rather than http://stock.com.

Once tunneling between service endpoints is established and a service is registered on TARGET, the service description (WSDL) becomes exoteric which can be discovered by its clients through TARGET which locates at the DMZ.

Figure 4:
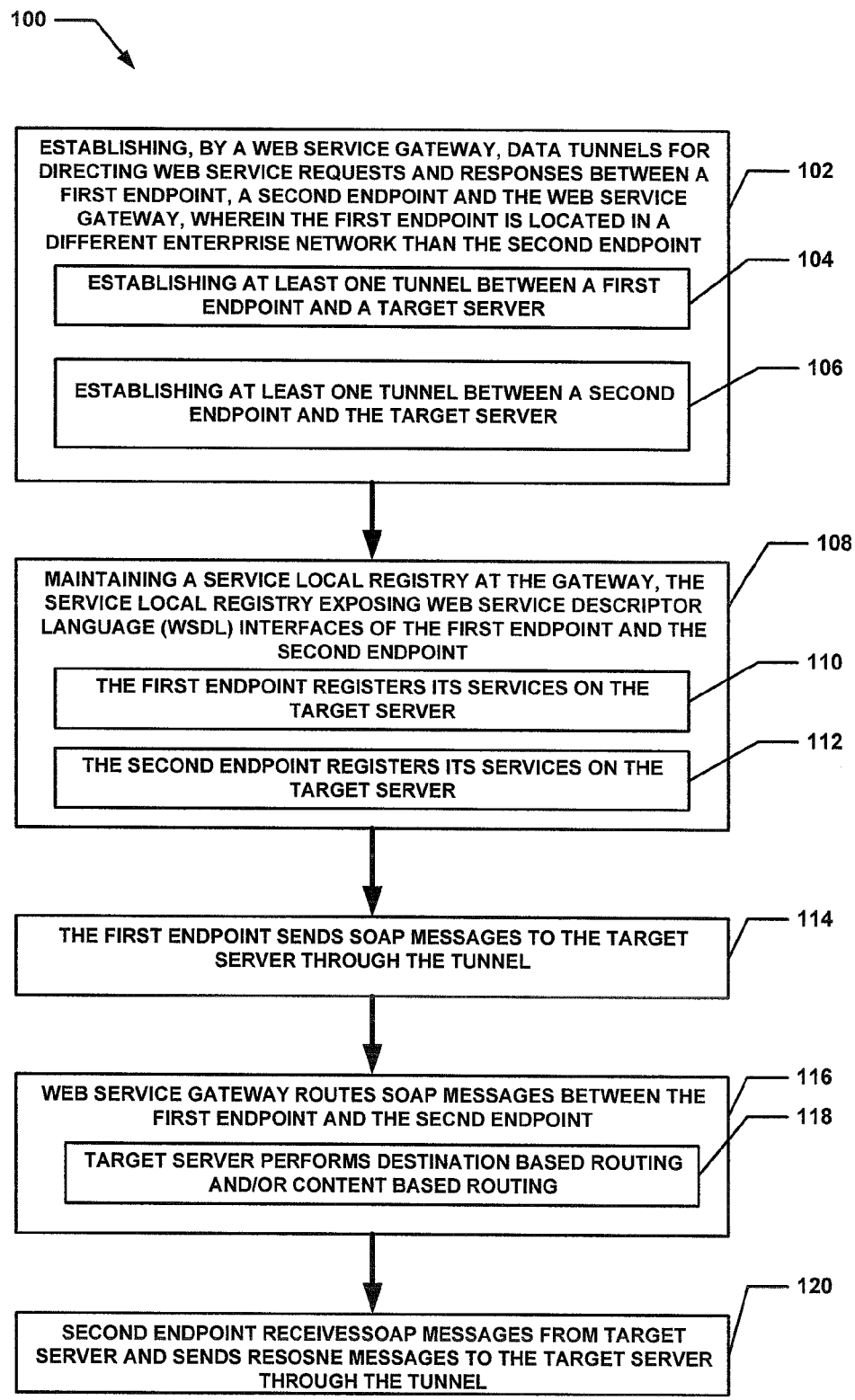
FIG. 4 illustrates an example flow diagram for a computer system that performs two-way web service interaction crossing an enterprise domain in accordance with embodiments of the invention.

A flow chart of a particular embodiment of the presently disclosed method is depicted in FIG. 4. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4, a particular embodiment of the method 100 of providing two-way web service interaction crossing an enterprise domain 100 begins with processing block 102 which discloses establishing, by a web service gateway, data tunnels for directing web service requests and responses between a first endpoint, a second endpoint and the web service gateway, wherein the first endpoint is located in a different enterprise network than the second endpoint. Processing block 104 discloses establishing at least one tunnel between a first endpoint and TARGET server. Processing block 106 discloses establishing at least one tunnel between a second endpoint and TARGET server.

Processing continues with processing block 108 which states maintaining a Service Local Registry at the gateway, the Service local Registry exposing Web Service Description Language (WSDL) interfaces of the first endpoint and the second endpoint. Processing block 110 discloses a first endpoint registers its services on TARGET server. Processing block 112 discloses a second endpoint registers its services on TARGET server.

Processing block 114 states a first endpoint sends SOAP messages to TARGET server through the tunnel. The messages sent contain the service destination, which is a second endpoint.

Processing block 116 discloses wherein the web service gateway routes SOAP messages between the first endpoint and the second endpoint. Processing block 118 states wherein the TARGET server performs at least one of the group consisting of destination based routing and content based routing.

Processing block 120 states a second endpoint receives SOAP messages from TARGET server and sends response messages to TARGET server, all through the tunnel.

The Two-way Web Service Router Gateway, for two-way web service interaction crossing enterprise domains and firewalls provides a full support for asynchronous outbound operation and event notification in communication services. Unlike other web service access points and gateways designed for one-way web service interaction, TARGET is designed to bridge two-way web service interaction and service routing for endpoints behind their protected firewalls and enterprise domains.

TARGET provides a generic solution to allow two-way web service interaction to traverse legitimately through NATs and strictly configured firewalls. A research TARGET system has been implemented and applied to real time communication services, e.g. conferencing. Extensive experiments on TARGET were performed. In particular, the end-to-end system performance of TARGET with/without Tomcat web server overheads for various sizes of SOAP message payloads was studied. The results indicated that TARGET is well suited for real-time communication applications.

The scalability of TARGET was also described when the number of simultaneous clients increases. Experimental results indicated that the increase of the processing time is not in the same proportion to the client and message size increments. These studies further verify the feasibility and applicability of TARGET for two-way web service interaction over enterprise domains.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of providing two-way web service interaction crossing different enterprise domains, the method comprising:
   establishing, by a web service gateway, data tunnels for directing web service messages including web service requests and responses between a first endpoint, a second endpoint and said web service gateway, wherein said first endpoint is located in a different enterprise network than said second endpoint;
   storing a web service destination along with the web service messages;
   routing web service messages according to a special routing table that maps a web service destination to one of said data tunnels;
   maintaining a Service Local Registry at said web service gateway, said Service Local Registry exposing Web Service Description Language (WSDL) interfaces of said first endpoint and said second endpoint, and wherein both incoming and outgoing data packets are transmitted within an established tunnel, to allow said web service gateway to perform bi-directional routing;
   wherein said first endpoint is a client and said second endpoint is a server, maintaining a Service Local Registry at said gateway, said Service Local Registry exposing Web Service Description Language (WSDL) interfaces of said first endpoint and said second endpoint, further comprises registering the interface of the client to make it visible for interaction with the server;
   wherein a first data tunnel is established between said first endpoint, through a first firewall, and with said web service gateway; wherein a second data tunnel is established between said second endpoint, through a second firewall, and with said web service gateway; and wherein said first endpoint communicates with said second endpoint through said first firewall, said web service gateway and said second firewall by way of said first tunnel and said second tunnel; and
   wherein said web service gateway utilizes WS-Addressing header and other transport-dependent headers to store and extract service destination information.

2. The method of claim 1 wherein said establishing data tunnels includes establishing at least one tunnel between each endpoint and said web service gateway.

3. The method of claim 1 wherein said establishing data tunnels includes initiating tunnel establishment from said first endpoint to said web service gateway, and said second endpoint to said web service gateway.

4. The method of claim 1 wherein said web service gateway routes web service messages comprising Simple Object Access Protocol (SOAP) messages between said first endpoint and said second endpoint.

5. The method of claim 1 wherein said web service gateway brokers web service messages comprising Simple Object Access Protocol (SOAP) messages between said first endpoint and said second endpoint.

6. The method of claim 1 wherein said first endpoint and said second endpoint interact with each other in a full-duplex web service interaction.

7. A non-transitory computer readable storage medium having computer readable code stored thereon for providing two-way web service interaction crossing an enterprise domain, the medium comprising:
   instructions for establishing, by a web service gateway, data tunnels for directing web service messages comprising web service requests and responses between a first endpoint, a second endpoint and said web service gateway, wherein said first endpoint is located in a different enterprise network than said second endpoint; and
   instructions for maintaining a Service Local Registry at said web service gateway, said Service Local Registry exposing Web Service Description Languages (WSDL) interfaces of said first endpoint and said second endpoint, and wherein both incoming and outgoing data packets are transmitted within an established tunnel, to allow said web service gateway to perform bi-directional routing; wherein said first endpoint is a client and said second endpoint is a server, maintaining a Service Local Registry at said gateway, said Service Local Registry exposing Web Service Description Language (WSDL) interfaces of said first endpoint and said second endpoint, further comprises registering the interface of the client to make it visible for interaction with the server;

wherein a first data tunnel is established between said first endpoint, through a first firewall, and with said web service gateway; wherein a second data tunnel is established between said second endpoint, through a second firewall, and with said web service gateway; and wherein said first endpoint communicates with said second endpoint through said first firewall, said web service gateway and said second firewall by way of said first tunnel and said second tunnel; and wherein said web service gateway utilizes WS-Addressing header and other transport-dependent headers to store and extract service destination information.

8. The computer readable medium of claim 7 wherein said instructions for establishing data tunnels includes instructions for establishing at least one data tunnel between an endpoint and said web service gateway.

9. The computer readable medium of claim 7 wherein said instructions for establishing data tunnels includes instructions for initializing data tunnel establishment from said first endpoint to said web service gateway, and said second endpoint to said web service gateway.

10. The computer readable medium of claim 7 further comprising instructions wherein said web service gateway brokers web service messages comprising Simple Object Access Protocol (SOAP) messages between said first endpoint and said second endpoint.

11. The computer readable medium of claim 10 further comprising instructions for providing end-to-end message level security by placing security credentials in said SOAP messages.

12. The computer readable medium of claim 10 further comprising instructions wherein said SOAP message routing is performed using bi-directional next hop routing.

13. A web service gateway comprising:
a memory;
a processor;
a communications interface;
an interconnection mechanism coupling the memory, the processor and the communications interface; and
wherein the memory is encoded with an application providing two-way web service interaction crossing an enterprise domain, that when performed on the processor, provides a process for processing information, the process causing the web service gateway to system to perform the operations of:
establishing, by said web service gateway, data tunnels for directing web service requests and responses between a first endpoint, a second endpoint and said web service gateway, wherein said first endpoint is located in a different enterprise network than said second endpoint; and
maintaining a Service Local Registry at said web service gateway, said Service Local Registry exposing Web Service Description Language (WSDL) interfaces of said first endpoint and said second endpoint, and wherein both incoming and outgoing data packets are transmitted within an established tunnel, to allow said web service gateway to perform bi-directional routing;

wherein said first endpoint is a client and said second endpoint is a server, maintaining a Service Local Registry at said gateway, said Service Local Registry exposing Web Service Description Language (WSDL) interfaces of said first endpoint and said second endpoint, further comprises registering the interface of the client to make it visible for interaction with the server;

wherein a first data tunnel is established between said first endpoint, through a first firewall, and with said web service gateway; wherein a second data tunnel is established between said second endpoint, through a second firewall, and with said web service gateway; and wherein said first endpoint communicates with said second endpoint through said first firewall, said web service gateway and said second firewall by way of said first tunnel and said second tunnel; and wherein said web service gateway utilizes WS-Addressing header and other transport-dependent headers to store and extract service destination information.

14. The web service gateway of claim 13 wherein said establishing data tunnels includes said web service gateway performing at least one of local port forwarding and remote port forwarding.

15. The web service gateway of claim 13 wherein said establish data tunnels includes establishing at least one tunnel between an endpoint and said web service gateway.

16. The web service gateway of claim 13 wherein said establishing data tunnels includes initiating data tunnel establishment from said first endpoint to said web service gateway, and said second endpoint to said web service gateway.

17. The web service gateway of claim 13 wherein said web service gateway brokers web service messages comprising Simple Object Access Protocol (SOAP) messages between said first endpoint and said second endpoint.

18. The web service gateway of claim 17 further comprising providing end-to-end message level security by placing security credentials in said SOAP messages.

19. The web service gateway of claim 17 wherein said local port switching and said SOAP message routing is performed using bi-directional next hop routing.

20. The web service gateway of claim 14 wherein said application includes a listener module, a forwarding engine in communication with said listener module, a routing table in communication with said forwarding engine and a dispatcher in communication with said forwarding engine; and wherein said listener module receives messages from a first endpoint and forwards said messages to said forwarding engine; said forwarding engine parses a body of the message and retrieves the WS-Addressing headers or any content designated as part of the key to query a Routing Table (RT), said routing table maintaining a file including destination/next-hop pairs which is parsed loaded into memory such that when queried by said forwarding engine, said RT searches the file and returns a next-hop address for a message towards its endpoint destination; and said dispatcher reassembles a message and dispatches it to its next-hop according to the query result from the routing table.

* * * * *